United States Patent
Buhl et al.

[11] Patent Number: 5,848,094
[45] Date of Patent: Dec. 8, 1998

[54] HEAT TRANSMISSION MONITORING AND/OR MEASURING APPARATUS

[75] Inventors: Peter Buhl, Weingarten; Clemens Geiger, Landensberg; Walter Reichart, Fronreute, all of Germany

[73] Assignee: i f m electronic GmbH, Essen, Germany

[21] Appl. No.: 750,265

[22] PCT Filed: Apr. 3, 1996

[86] PCT No.: PCT/EP96/01467

§ 371 Date: Mar. 14, 1997

§ 102(e) Date: Mar. 14, 1997

[87] PCT Pub. No.: WO96/31759

PCT Pub. Date: Oct. 10, 1996

[30] Foreign Application Priority Data

Apr. 3, 1995 [DE] Germany .................. 195 12 111.2

[51] Int. Cl.⁶ .................................................. G01K 17/06
[52] U.S. Cl. ...................... 374/31; 374/147; 73/204.23
[58] Field of Search ................. 374/31, 36, 39, 374/40, 43, 44, 147, 148, 164; 73/204.23, 204.24, 204.25, 204.26

[56] References Cited

U.S. PATENT DOCUMENTS

| 3,400,582 | 9/1968 | Warner . |
| 3,852,570 | 12/1974 | Tyler ........................................ 374/164 |
| 4,319,483 | 3/1982 | Durham, Jr. et al. ............... 73/204.25 |
| 4,618,266 | 10/1986 | Feller ........................................ 374/40 |
| 4,850,717 | 7/1989 | Clark et al. . |
| 4,972,708 | 11/1990 | Wiegleb et al. ...................... 73/204.26 |
| 5,108,193 | 4/1992 | Furubayashi ............................. 374/164 |
| 5,119,674 | 6/1992 | Nielsen ................................. 73/204.24 |
| 5,428,994 | 7/1995 | Wenzel et al. ....................... 73/204.25 |
| 5,632,556 | 5/1997 | Sivyer ..................................... 374/148 |

FOREIGN PATENT DOCUMENTS

| 0 590 449 A2 | 4/1994 | European Pat. Off. . |
| 2 411 392 | 7/1979 | France . |
| 32 22 046 A1 | 12/1983 | Germany . |
| 1 219 710 | 1/1971 | United Kingdom . |
| 2 272 296 | 5/1994 | United Kingdom . |

OTHER PUBLICATIONS

*Moderne Strömungs–Sensoren Nach Einem Kalorimetrischen Prinzip*, R. Lauer, 118 Messen & Prufen Automatisieren 29 (1993) Mar. No. 1/2, Kaufering, Germany pp. 4–7.

*A Thermal Mass Flow Monitor For Continuous Emissions Monitoring Systems (CEMS)*, J.G. Olin, 8131 Advances in Instrumentation and Control, vol. 48 (1993) Part 3, Research Triangle Park, NC, US, pp. 1637–1648, 1651–1653.

*Primary Examiner*—G. Bradley Bennett
*Attorney, Agent, or Firm*—Sixbey, Friedman, Leedom & Ferguson; David S. Safran

[57] ABSTRACT

Disclosed in a heat transmission monitoring and/or measuring apparatus, namely a flow measurement apparatus, for flowing mediums. It comprises a housing (1), a heating element (2) and a temperature measurement element (3). According to the invention, relatively high sensititivity and relatively high reaction speed is obtained by designing the heating element (2) and temperature measurement element (3) as pins.

28 Claims, 6 Drawing Sheets

HEAT TRANSMISSION MONITORING AND/ OR MEASURING APPARATUS

BACKGROUND OF THE INVENTION

1. Field of the Invention

The invention relates to a heat transfer monitoring and/or measuring device, especially a flow indicator and/or flow measuring device for flowing media, with a housing, a heating element and at least one temperature measuring element.

2. Description of Related Art

Initially it was stated that the invention relates to a heat transfer monitoring device and/or a heat transfer measuring device. Heat transfer monitoring device here means an embodiment in which heat transfer is simply monitored, in which therefore the presence or absence of a certain heat transfer is ascertained. Conversely, heat transfer measuring device stands for an embodiment in which heat transfer is measured; therefore an analog measured value corresponding to the heat transfer is obtained which can also be converted into a digitized measured value. In other words, a heat transfer monitoring device delivers a qualitative result "heat transfer present" or "heat transfer absent", while a heat transfer measuring device delivers a quantitative result with reference to heat transfer.

Heat transfer monitoring devices and/or heat transfer measuring devices of the type addressed here and indicated in differentiated form above are used especially for acquisition of heat transport by flowing media. Then they are flow indicators or flow measuring devices, in the sense of the aforementioned differentiation flow indicators corresponding to heat transfer monitoring devices and flow measuring devices to heat transfer measuring devices.

Heat transfer monitoring devices or heat transfer measuring devices as well as flow indicators or flow measuring devices of the type under discussion here operate according to the calorimetric principle. Generally differential temperature measurement is used. A first temperature measuring element measures the actual measurement temperature, the measurement temperature resulting from the heat output of the heating element, the temperature of the flowing medium and the flow-dependent heat transport capacity of the flowing medium. Furthermore generally a second temperature measuring element measures a reference temperature. For the teaching of the invention measurement of the reference temperature is not absolutely essential; it can be omitted for example when the temperature of the flowing medium is known.

It was stated at the start that the subject of the invention includes a heating element and at least one temperature measuring element. Here the heating element can also assume the function of the above explained second temperature measuring element; it is then a heating and temperature measuring element.

In the prior art heat transfer monitoring and/or measuring devices which operate according to the calorimetric principle, especially also flow indicators or flow measuring devices are known in several forms (compare German patent disclosure documents 24 47 617, 26 29 051, 32 13 902, 32 22 046, 37 13 981, 38 11 728, 38 25 059, 39 11 008 and 39 43 437, furthermore not yet published patent application 195 04 496.7). It is common to all known embodiments that they have only relatively low sensitivity and relatively low reaction speed; here reaction speed means the ability to react relatively quickly during rapid changes of temperature and/ or flow velocity of the medium and to deliver relatively accurate measured values.

SUMMARY OF THE INVENTION

Consequently, the object of the invention is to devise a heat transfer monitoring and/or measuring device, especially a flow indicator and/or flow measuring device with relatively high sensitivity and relatively high reaction speed.

The heat transfer monitoring and/or measuring device according to the invention, in which the aforementioned object is achieved is characterized first of all and essentially in that the heating element and the temperature measuring element are made in the form of pins. In doing so the heating element, as explained above, can be a heating and temperature measuring element.

The heat transfer monitoring and/or measuring device according to the invention includes a housing, as mentioned at the start. This housing contains the heating element, the temperature measuring element or temperature measuring elements and electrical or electronic components and parts connected to one another into a circuit. Controls and/or displays can be built into the housing. Finally the housing can be provided with a connector; alternatively to a connector a connecting cable can be routed out of the housing.

The assignment of the heating element and the temperature measuring element or temperature measuring elements to the housing and the flowing medium can be done differently.

With respect to the assignment of the heating element and temperature measuring element or temperature measuring elements to the housing and to the flowing medium a first embodiment of the heat transfer monitoring and/or measuring device according to the invention is characterized in that the heating element and the temperature measuring element or temperature measuring elements are integrated into the sensor part of the housing which comes into contact with the flowing medium. Here the sensor part of the housing which comes into contact with the flowing medium can be made in the form of a truncated cone. However an embodiment is more advantageous in which the sensor part of the housing which comes into contact with the flowing medium has a step-like shoulder, preferably from roughly 0.2 to 1 mm, especially roughly 0.5 mm. This step-like shoulder leads to a certain swirling of the flowing medium; this benefits the characteristic of the heat transfer monitoring and/or measuring device. Here characteristic means the dependency of the output signal on the speed of the flowing medium.

An embodiment which is different than the one described above with reference to the assignment of the heating element and the temperature measuring element or temperature measuring elements to the housing and the flowing medium is characterized in that the heating element and the temperature measuring element or temperature measuring elements are inserted into the wall of a pipe which carries the flowing medium. While therefore in the embodiment described first the heating element and the temperature measuring element or temperature measuring elements are connected mechanically to the housing, specifically to the sensor part of the housing which comes into contact with the flowing medium, for the embodiment described last it holds that the heating element and the temperature measuring element or temperature measuring elements are mechanically connected to the pipe carrying the flowing medium.

If it has been stated above that according to the invention the heating element and the temperature measuring element are made in the form of pins, it is enough if the heating element and/or the temperature measuring element is/are made only partially in the form of pins, specifically only the part which is integrated in the sensor part of the housing or which is inserted into the wall of the pipe carrying the flowing medium is made in the form of a pin. Preferably here it applies that the heating element and/or the temperature measuring element is/are made flat, inasmuch as a pin-shaped version is not implemented. Overall the described version of the heating element and the temperature measuring element is of especially low mass; this is important for the relatively high sensitivity and relatively high reaction speed achieved according to the invention.

In particular, in the embodiment of the heat transfer monitoring and/or measuring device according to the invention in which the heating element and the temperature measuring element or temperature measuring elements are integrated into a sensor part of the housing which comes into contact with the flowing medium, the housing has preferably at least partially the form of a circular cylinder. Here then the sensor part which comes into contact with the flowing medium is the front of the housing which, as already detailed, can be made in the form of a truncated cone, however preferably has a step-like shoulder. Then the heating element and the temperature measuring element or temperature measuring elements are integrated into the housing front which is implemented as described above and which acts as the sensor part. Here integrated means that the heating element and the temperature measuring element or temperature measuring elements project from inside the housing into the sensor part of the housing. Specifically therefore the heating element and the temperature measuring element or temperature measuring elements are integrated only partially into the sensor part of the housing.

For the desired relatively high sensitivity and relatively high reaction speed of the heat transfer monitoring and/or measuring device according to the invention the interaction of the pin-shaped heating element and the pin-shaped temperature measuring element on the one hand with the flowing medium on the other hand is important. The detailed design in the area of the ends of the heating element and temperature measuring element near the flowing medium therefore acquires special importance.

In the heat transfer monitoring and/or measuring device according to the invention the heating element and the temperature measuring element can be inserted externally flush into the sensor part of the housing or into the wall of the pipe carrying the flowing medium. However, it is also possible to insert the heating element and the temperature measuring element slightly, preferably by roughly 1 to 2 mm, set back into the sensor part of the housing or the wall of the pipe carrying the flowing medium and to fill the volume remaining in the sensor part of the housing or in the wall of the pipe carrying the flowing medium with solder, preferably soft solder, for example, silver solder. Any solder projecting above the sensor part of the housing or the wall of the pipe carrying the flowing medium must then be removed. Finally however it is also possible to allow the heating element and the temperature measuring element or temperature measuring elements to project roughly 0.05 to 1.0 mm, especially roughly 0.1 to 0.4 mm into the flowing medium. This embodiment is generally especially advantageous.

Other features and advantages of this invention follow from the following description of one embodiment using the drawing itself. In this case all described features in and of themselves and in any combination form the subject of the invention.

DETAILED DESCRIPTION OF THE PREFERRED EMBODIMENTS

The heat transfer monitoring and/or measuring device shown is a flow measuring device for flowing media. This flow measuring device includes, as necessary to its operation, housing 1, heating element 2 and temperature measuring element 3. Heating element 3 is, which is not important within the framework of the invention, a heating and temperature measuring element so that the initially described differential temperature measurement can be done. The electrical and electronic components provided within housing 1 and belonging to the flow measuring device according to the invention are not shown.

According to the invention heating element 2 and temperature measuring element 3 are made first of all in the form of pins.

With respect to the assignment of heating element 2 and temperature measuring element 3 to housing 1 and to the flowing medium the Figures show different embodiments.

Figure 1:
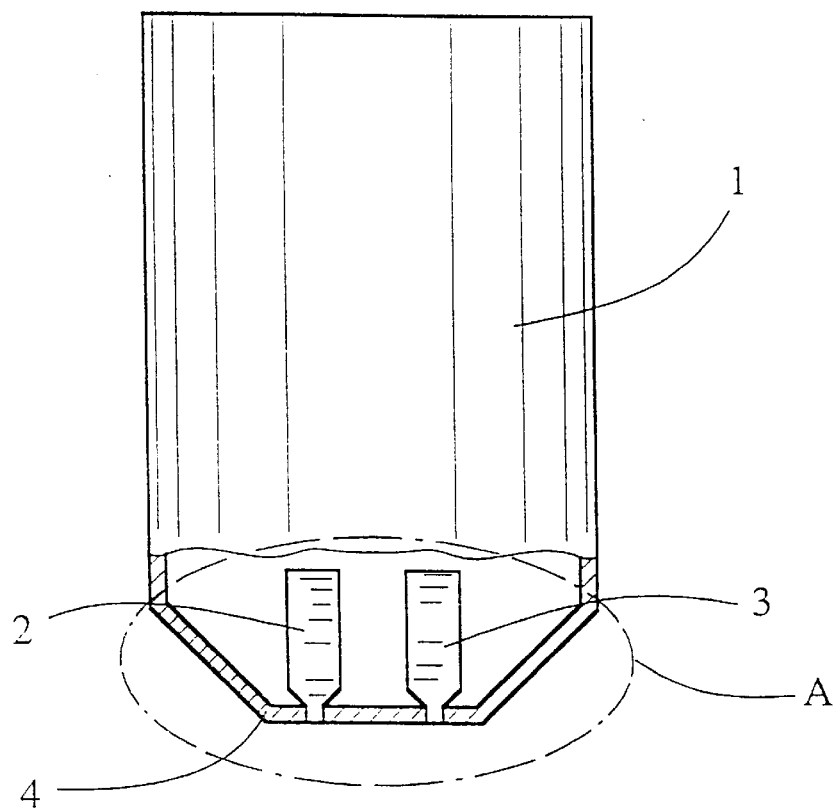
FIG. 1 schematically shows one preferred embodiment of a heat transfer monitoring and/or measuring device according to the invention, partially in cross section.
Figure 2:
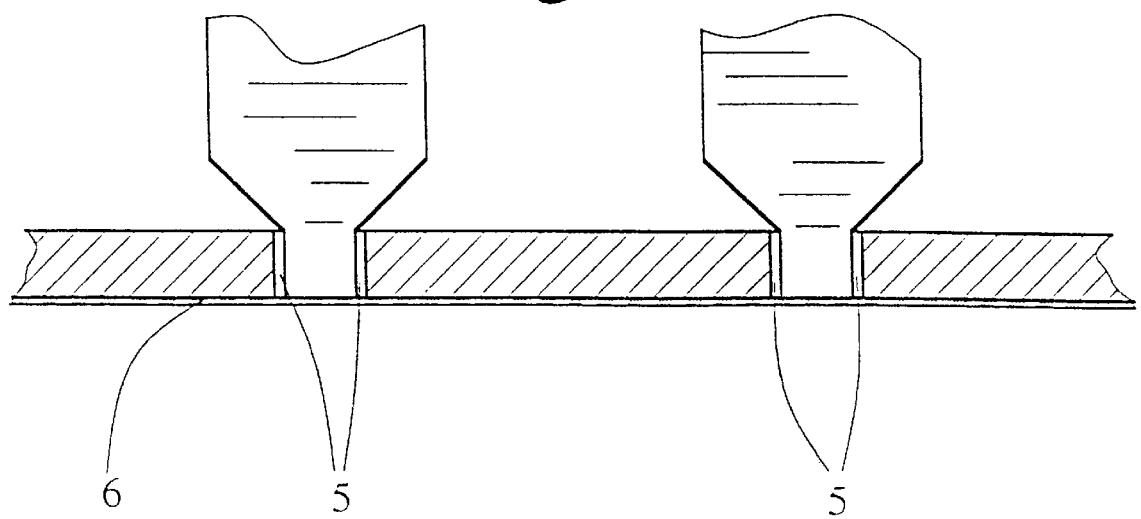
FIG. 2 shows extract A from the article according to FIG. 1 on a larger scale.
Figure 3:
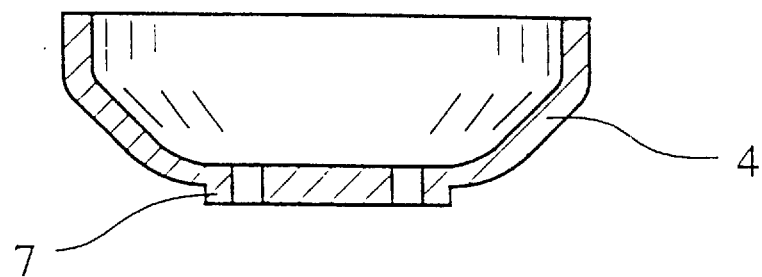
FIG. 3 shows an embodiment of the sensor part of the housing of a heat transfer monitoring and/or measuring device according to the invention which is different from FIG. 1.

For the embodiment which includes FIGS. 1 through 7 it holds that heating element 2 and temperature measuring element 3 are integrated into sensor part 4 of housing 1, the sensor part coming into contact with the flowing medium. Here sensor part 4 of housing 1 which comes into contact with the flowing medium can be made in the shape of a truncated cone, as shown in FIG. 1. However an embodiment is more advantageous in which sensor part 4 of housing 1 which comes into contact with the flowing medium has step-like shoulder 7, as shown in FIG. 3. This step-like shoulder 7, preferably from roughly 0.2 to 1 mm, leads to a certain swirling of the flowing medium; this benefits the characteristic of the flow measuring device according to the invention. FIG. 3 shows essentially a mixed form of the truncated cone-shaped design and implementation of step-like shoulder 7. Instead of this mixed form step-like shoulder 7 can also be implemented in an otherwise plane sensor part 4 of housing 1.

For the embodiment of the flow measuring device according to the invention which is shown in its basic type in FIGS. 8 through 15, it holds that heating element 2 and temperature measuring element 3 are inserted into wall 8 of pipe 9 which carries the flowing medium. While therefore in the embodiment which is shown essentially in FIG. 1 heating element 2 and temperature measuring element 3 are mechanically joined to housing 1, specifically to sensor part 4 of housing 1 which comes into contact with the flowing medium, it applies to the embodiment according to FIGS. 8 through 15 that heating element 2 and temperature measuring element 3 are mechanically joined to pipe 9 which carries the flowing medium.

Otherwise, the figures show embodiments of flow measuring devices according to the invention in which heating element 2 and temperature measuring element 3 are made only partially as pins; only the part which is integrated in sensor part 4 of housing 1 or which is inserted into wall 8 of pipe 9 which carries the flowing medium is made pin-shaped. To the extent that a pin-shaped version is not accomplished, heating element 2 and temperature measuring element 3 are made flat. Overall, the above described version of heating element 2 and temperature measuring element 3 have especially low mass; this is essential for the relatively high sensitivity and relatively high reaction speed achieved according to the invention.

As FIG. 1 shows, in the illustrated embodiment of the flow measuring device according to the invention housing 1 has the shape of a circular cylinder. Here sensor part 4 which comes into contact with the flowing medium is the front of housing 1 which is made in the form of a truncated cone. Therefore heating element 2 and temperature measuring element 3 are integrated into the front of housing 1 which acts as sensor part 4. Here integrated means that heating element 2 and temperature measurement element 3 project from the inside of housing 1 into sensor part 4 of housing 1; strictly speaking therefore heating element 2 and temperature measuring element 3 are only partially integrated into sensor part 4 of housing 1.

Figure 7:
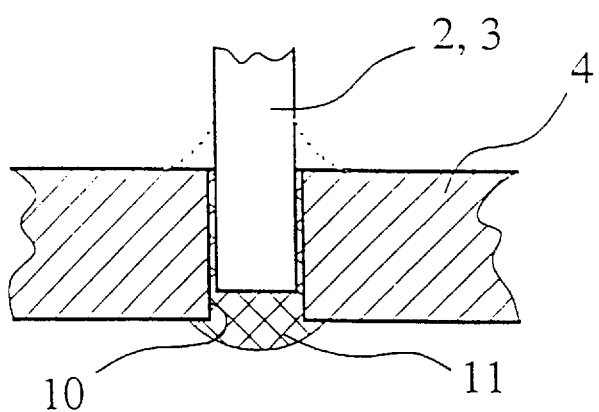
FIG. 7 shows an extract in the area in the sensor part of the housing of a heat transfer monitoring and/or measuring device according to the invention.
Figure 8:
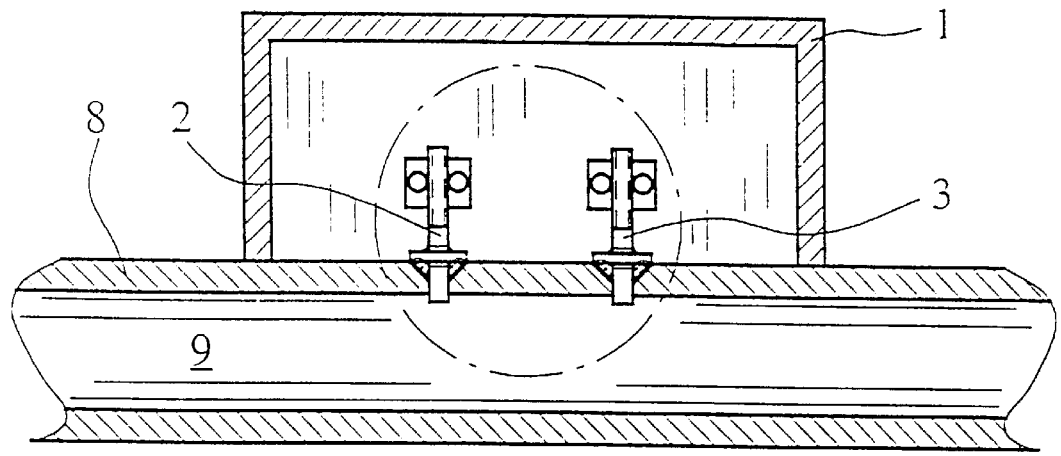
FIG. 8 shows an embodiment of a heat transfer monitoring and/or measuring device according to the invention which is fundamentally different than the one shown in FIG. 1.
Figure 9:
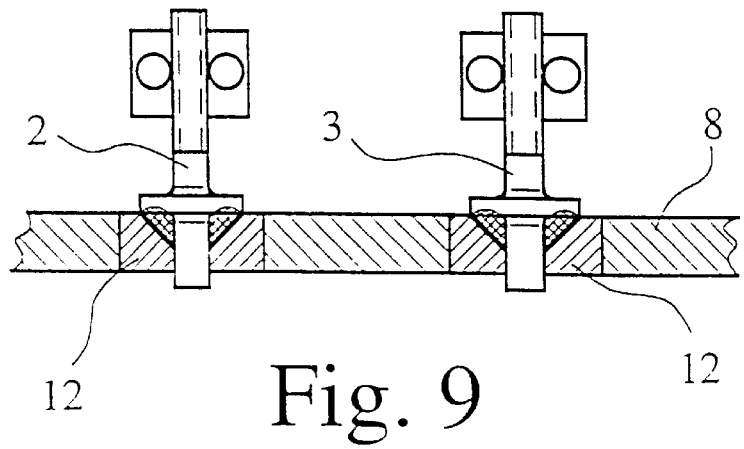
FIG. 9 shows extract B from the article according to FIG. 8 on a larger scale.
Figure 10:
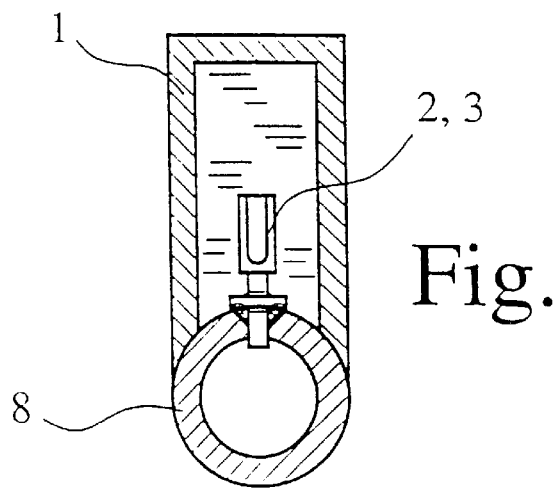
FIG. 10 shows a cross section through the article according to FIG. 8.
Figure 11:
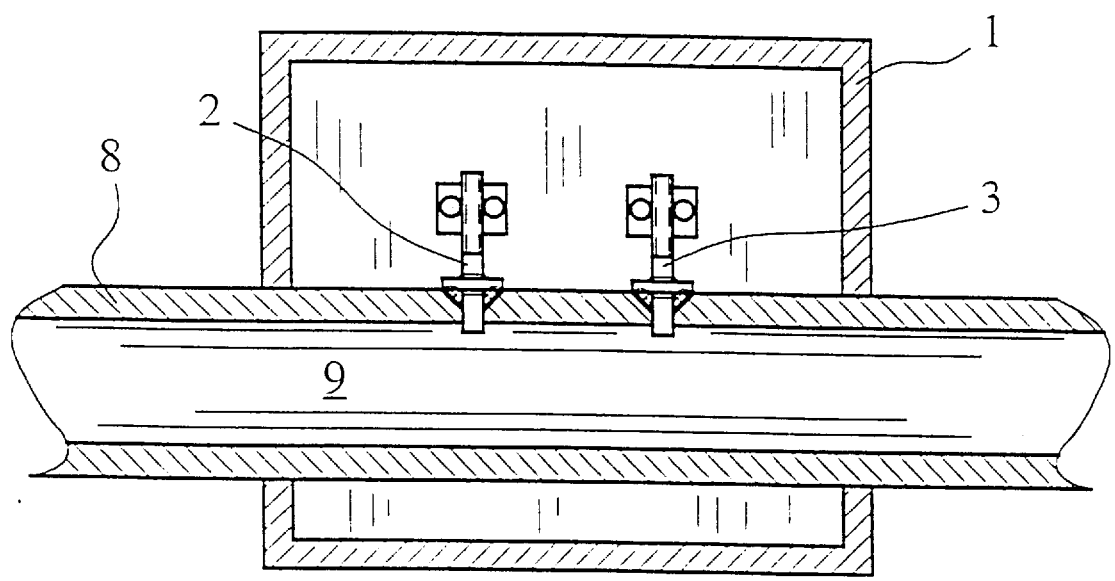
FIG. 11 shows one embodiment of a heat transfer monitoring and/or measuring device according to the invention which is only slightly different than the one shown in FIG. 8.
Figure 12:
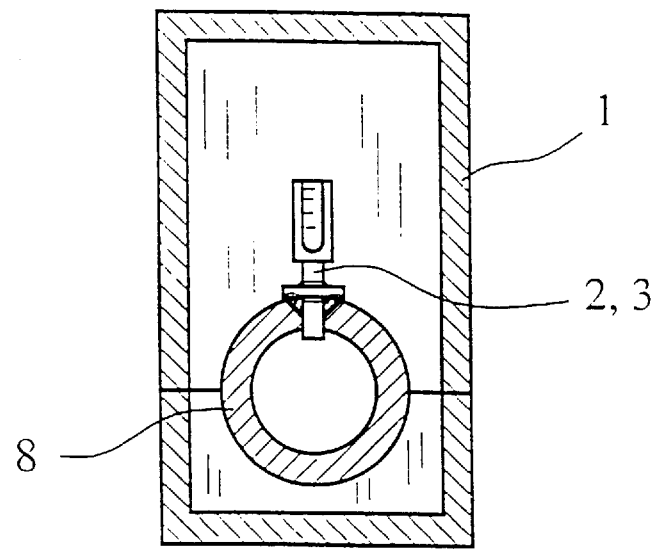
FIG. 12 shows a cross section through the article according to FIG. 11.
Figure 13:
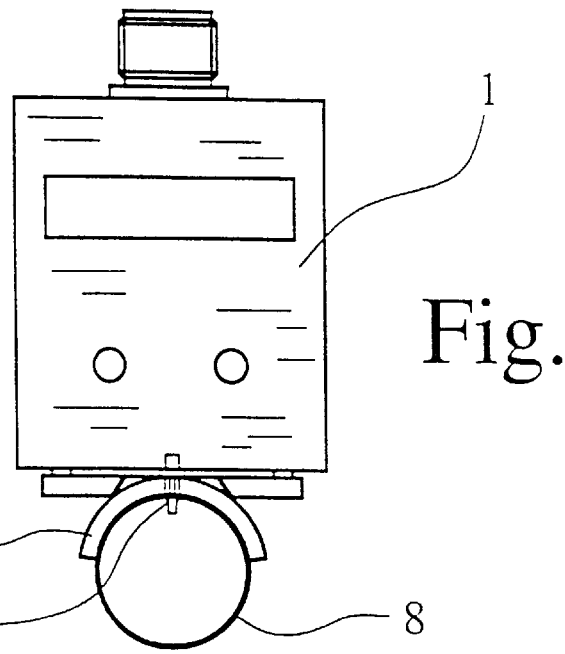
FIG. 13 shows one view of another embodiment of a heat transfer monitoring and/or measuring device according to the invention which is similar to the embodiment shown in FIG. 8.

In the embodiment of the flow measuring device according to the invention which is shown in FIGS. 1 and 2, heating element 2 and temperature measuring element 3 are inserted into sensor part 4 of housing 1 such that heating element 2 and temperature measuring element 3 end externally flush with sensor part 4 of housing 1. An embodiment of the flow measuring device according to the invention which differs from the embodiment shown in FIGS. 1 and 2 is shown in FIG. 7. In this embodiment heating element 2 and temperature measuring element 3 are inserted slightly, for example by roughly 1 to 2 mm, set back into sensor part 4 of housing 1 and volume 10 which remains in sensor part 4 of housing 1 is filled with solder, preferably soft solder, for example silver solder. Here FIG. 7 shows that some of solder 11 projects above sensor part 4 of housing 1; this part of solder 11 must still be removed.

For the embodiment of the flow indicator according to the invention which are shown in FIGS. 8 through 15, it holds that heating element 2 and temperature measuring element 3 project slightly, preferably roughly 0.05 to 1.0 mm, especially roughly 0.1 to 0.4 mm, into the flowing medium. This projection into the flowing medium can also be accomplished in the embodiment of the flow measuring device according to the invention which is shown in FIGS. 1 and 2.

Figure 5:
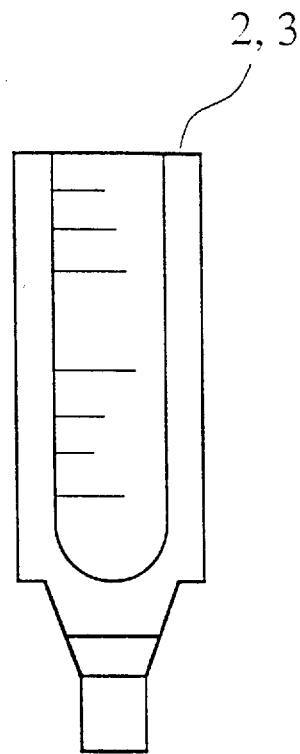
FIG. 5 shows a side view of one preferred embodiment of a heating element or a temperature measuring element of a heat transfer monitoring and/or measuring device according to the invention.
Figure 6:
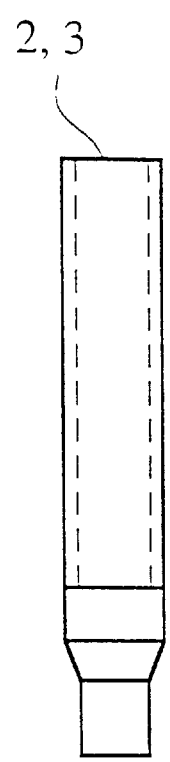
FIG. 6 shows the article according to FIG. 5 in a side view shifted by 90°.

FIGS. 5 and 6 show that in the flow measuring devices according to the invention heating element 2 and temperature measuring element 3 in the area of the pin-shaped implementation can have a circular cross section. In the area of the pin-shape implementation of heating element 2 and temperature measuring element 3 the diameter is roughly 0.5 to 1.5 mm, preferably roughly 0.8 mm. Optimum values for the diameter under discussion here can be found by empirical studies; the optimum diameter is dependent mainly on the thermal conductivity of the flowing medium.

The object according to the invention, that is, relatively high sensitivity and relatively high reaction speed, is achieved especially well when heating element 2 and temperature measuring element 3 consist of material with good heat conductivity, for example, copper, silver or a ceramic material with good thermal conductivity. In contrast, sensor part 4 of housing 1 which preferably has thickness of roughly 0.2 to 1.0 mm, especially roughly 0.5 mm, consists of material with poor thermal conductivity, for example, plastic, ceramic or a metal with poor thermal conductivity, for example, V4A steel.

Generally, good thermal conductivity of heating element 2 and temperature measuring element 3 and poor thermal conductivity of sensor part 4 of housing 1 are desired. Especially with reference to housing 1 or sensor part 4 of housing 1 use of a material with poor thermal conductivity cannot always be accepted; for reasons of mechanical strength and/or corrosion resistance for example it can be necessary for housing 1 and thus also for sensor part 4 of housing 1 to use steel V4A, a material which does not have especially good thermal conductivity, but of which it cannot be said either that it has especially poor thermal conductivity. To achieve good measurement results anyway, it is recommended that heating element 2 and temperature measuring element 3 be inserted with a radial distance to sensor part 4 of housing 1 into sensor part 4 of housing 1. In doing so then intermediate space 5 between heating element 2 and temperature measuring element 3 on the one hand and sensor part 4 of housing 1 on the other is provided with a material with poor thermal conductivity, for example, glass solder. Thus it is also accomplished that heating element 2 and temperature measuring element 3 are inserted pressure tight and compression-proof into sensor part 4 of housing 1.

Basically heating element 2 and temperature measuring element 3 can be directly exposed to the flowing media. For various reasons however it can be advantageous to provide the fronts of heating element 2 and temperature measuring element 3 facing the flowing medium with cover layer 6. Also the side of sensor part 4 of housing 1 facing the flowing medium can be provided with cover layer 6. If at this point both heating element 2 and temperature measuring element 3 as well as sensor part 4 of housing 1 are to be provided with cover layer 6, it is recommended that this cover layer 6 be applied in the mounted state, therefore when heating element 2 and temperature measuring element 3 are introduced with their pin-like ends into sensor part 4 of housing 1 and furthermore intermediate space 5 between heating element 2 and temperature measuring element 3 on the one hand and sensor part 4 of the housing on the other is filled in the above described manner, for example, with glass solder.

Aforementioned cover layer 6 can be made and applied differently, for example as a galvanically applied nickel layer with a thickness of roughly 0.01 mm, as a chemically-reductively applied nickel layer with a thickness of roughly 0.005 mm, as a galvanically or chemical-reductively applied nickel-phosphorus layer, especially with roughly 13% phosphorus and preferably with a thickness of roughly 0.005 mm, as a galvanically or chemical-reductively applied copper-tin-zinc layer, especially with 55% copper, 25% tin and 20% zinc and preferably with a thickness of roughly 0.001 mm, or as a glass-like silicon oxide carbide layer, preferably with a thickness of 0.01 to 0.02 mm.

If so far heating element 2 has been addressed as belonging to the flow measuring device according to the invention, this means the element which, located in sensor part 4 of housing 1, introduces the heat output into the flowing medium. Of course actual heating element 2 includes a heating resistance which is not shown in the Figures which preferably is coupled thermally to heating element 2 via a conductor film; this of course is not shown in the Figures either.

It has been detailed above that in the embodiment according to FIG. 1 housing 1 of the flow measuring device according to the invention has the shape of a circular cylinder. Of course this is not essential. In particular, embodiments are also conceivable in which the housing is staggered, therefore has a sensor part with smaller diameter and a component part with a larger diameter.

Figure 4:
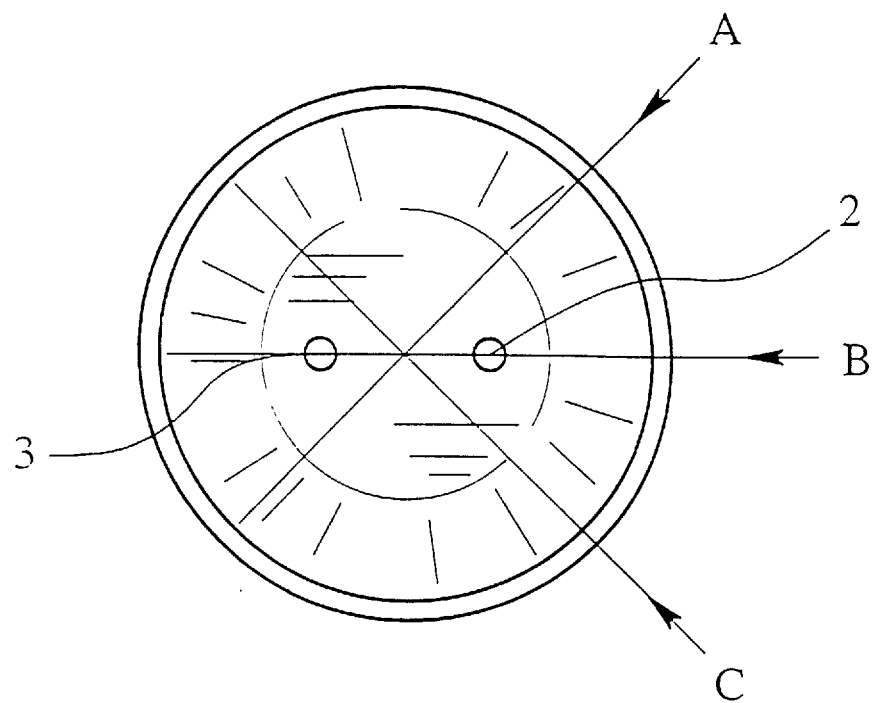
FIG. 4 shows an overhead view of the article according to FIG. 3.

FIG. 4 shows possible flow directions A, B, and C of the flowing medium relative to heating element 2 and temperature measuring element 3. Preferably the flow measuring device according to the invention should be installed such that flow direction A or flow direction C prevails; flow direction B is less favorable.

It was detailed above that good heat conductivity of heating element 2 and temperature measuring element 3 is desired. It is also stated that in the embodiment to which FIGS. 1 through 7 belong, sensor part 4 of housing 1 should consist of material with poor heat conductivity. The material surrounding heating element 2 and temperature measuring element 3 should thermally influence heating element 2 and temperature measuring element 3 as little as possible. For the embodiment of the flow measuring device according to the invention to which FIGS. 8 through 15 belong, it is therefore recommended that thermal insulator 12 be inserted into wall 8 of the pipe 9 carrying the medium and heating element 2 and temperature measuring element 3 be inserted into thermal insulator 12. This is shown in particular in FIG. 9.

Figure 14:
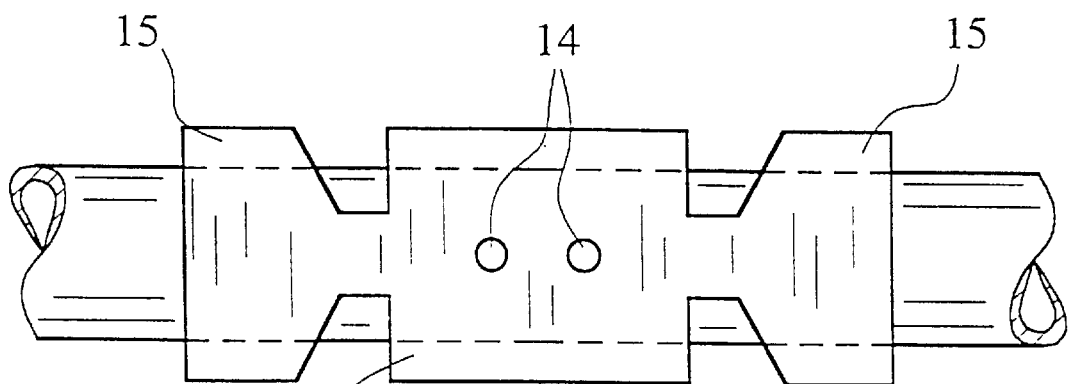
FIG. 14 shows a representation which is used to explain the subject according to FIG. 13.
Figure 15:
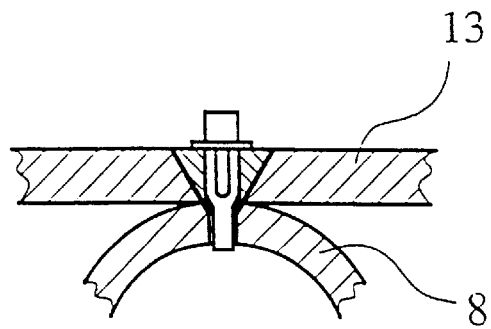
FIG. 15 shows a representation which is used in turn to explain the embodiment shown in FIG. 13.

For the embodiment of the flow measuring device according to the invention to which FIGS. 8 through 15 belong it holds, as already detailed, that heating element 2 and temperature measuring element 3 are inserted into wall 8 of a pipe 9 carrying the flowing medium. FIGS. 14 and 15 now show in addition template 13 which is provided with receivers 14 for heating element 2 and temperature measuring element 3. Template 13 on both sides has bending parts 15 which, bent beforehand or bent on site, are matched to pipe 9 which carries the flowing medium.

We claim:

1. Device for monitoring or measuring heat transfer via a temperature differential produced by a flowing medium, comprising a housing, a heating element and at least one temperature measuring element, wherein the heating element and the temperature measuring element are partially integrated into a sensor part of the housing, the sensor part, part of the heating element and part of the temperature measuring element are exposed for contact with the flowing medium; wherein the parts of the heating element and the temperature measuring element which are exposed for contact with the flowing medium are pin-shaped; wherein the pin-shaped parts of the heating element and of the temperature measuring element have a diameter from 0.5 to 1.5 mm; and wherein the heating element and the temperature measuring element are arranged in the sensor part of the housing with a radial distance between the heating element and the temperature measuring element and a surrounding wall of the sensor part in which they are arranged.

2. Device according to claim 1, wherein the exposed part of the sensor part of the housing is in the shape of a truncated cone.

3. Device according to claim 1, wherein exposed part of the sensor part of the housing has a step-shaped shoulder of a projecting height of about 0.2 to 1 mm.

4. Device according to claim 1, wherein an intermediate space between the sensor part of the housing and at least one of the heating element and the temperature measuring element is filled with a material having a poor thermal conductivity at least similar to that of glass solder.

5. Device according to claim 1, wherein the heating element and the temperature measuring element are mounted in the sensor part of housing in a pressure tight and compression-proof manner.

6. Device according to claim 1, wherein an exposed surface of the exposed part of the sensor part of housing is provided with a cover layer thereon.

7. Device according to claim 1, wherein at least one of heating element and the temperature measuring element is externally flush with an exterior surface of the exposed part of the sensor part of the housing.

8. Device according to claim 1, wherein at least one of the heating element and the temperature measuring element is set back into sensor part of the housing is by about 1 to 2 mm leaving a corresponding volume in the sensor part of the housing which is filled with a solder.

9. Device according to claim 1, wherein at least one of the heating element and the temperature measuring element projects about 0.05 to 1.0 mm into the flowing medium.

10. Device according to claim 1, wherein at least one of the heating element and the temperature measuring element has a circular cross section in the pin-shaped part thereof.

11. Device according to claim 1, wherein at least one of the heating element and temperature measuring element is comprised of material with a good heat conductivity similar to that of copper and silver.

12. Device according to claims 1, wherein the sensor part of the housing has a thickness of about 0.2 to 1.0 mm and is formed of material with poor thermal conductivity similar to that of plastic, ceramic and V4A steel.

13. Device according to claim 1, wherein an end of at least one of the heating element and the temperature measuring element facing the flowing medium is provided with a cover layer.

14. Device according to claim 13, wherein the cover layer is selected from the group consisting of a galvanically applied nickel layer with a thickness of about 0.01 mm, a chemically-reductively applied nickel layer with a thickness of about 0.005 mm, a galvanically or chemical-reductively applied nickel-phosphorus layer with a thickness of about 0.005 mm, a galvanically or chemical-reductively applied copper-tin-zinc layer with a thickness of about 0.001 mm, and a glass-like silicon oxide carbide layer with a thickness of 0.001 to 0.002 mm.

15. Device according to claim 1, wherein a heating resistance is thermally coupled to the heating element via a conductor film.

16. Device according to claim 1, wherein the pin-shaped parts of the heating element and of the temperature measuring element have a diameter from about 0.8 mm.

17. Device for monitoring or measuring heat transfer via a temperature differential produced by a flowing medium, comprising a housing, a heating element and at least one temperature measuring element; wherein the heating element and the at least one temperature measuring element are partially pin-shaped; and wherein the pin-shaped parts of the heating element and of the temperature measuring element are inserted into a wall of a pipe which carries the flowing medium.

18. Device according to claim 17, wherein thermal insulators are disposed in said wall of the pipe; and wherein the heating element and the temperature measuring element are mounted within a respective thermal insulator.

19. Device according to claim 18, wherein at least one of heating element and the temperature measuring element is externally flush with an exterior surface of said wall of the pipe carrying the flowing medium.

20. Device according to claim 17, wherein at least one of the heating element and the temperature measuring element is set back into the wall of the pipe carrying the flowing medium by about 1 to 2 mm leaving a corresponding volume in said wall of the pipe which is filled with a solder.

21. Device according to claim 17, wherein at least one of the heating element and the temperature measuring element projects about 0.05 to 1.0 mm into the flowing medium.

22. Device according to claim 17, wherein at least one of the heating element and the temperature measuring element has a circular cross section in the pin-shaped part thereof.

23. Device according to claim 17, wherein at least one of the heating element and temperature measuring element is comprised of material with a good heat conductivity similar to that of copper and silver.

24. Device according to claims 17, wherein the sensor part of the housing has a thickness of about 0.2 to 1.0 mm and is formed of material with poor thermal conductivity similar to that of plastic, ceramic and V4A steel.

25. Device according to claim 17, wherein an end of at least one of the heating element and the temperature measuring element facing the flowing medium is provided with a cover layer.

26. Device according to claim 25, wherein the cover layer is selected from the group consisting of a galvanically applied nickel layer with a thickness of about 0.01 mm, a chemically-reductively applied nickel layer with a thickness of about 0.005 mm, a galvanically or chemical-reductively applied nickel-phosphorus layer with a thickness of about 0.005 mm, a galvanically or chemical-reductively applied copper-tin-zinc layer with a thickness of about 0.001 mm, and a glass-like silicon oxide carbide layer with a thickness of 0.001 to 0.002 mm.

27. Device according to claim 17, wherein a heating resistance is thermally coupled to the heating element via a conductor film.

28. Device according to claim 17, wherein the pin-shaped parts of the heating element and of the temperature measuring element have a diameter from about 0.8 mm.

* * * * *